US008880579B2

(12) United States Patent
Battiston et al.

(10) Patent No.: US 8,880,579 B2
(45) Date of Patent: Nov. 4, 2014

(54) MONITOR DEVICE FOR COLLECTING AUDIENCE RESEARCH DATA

(75) Inventors: Daniel Battiston, Kirchberg (CH); Olivier Staub, Herrenschwanden (CH); Christian Clément, Arconciel (CH)

(73) Assignee: GFK Telecontrol AG, Hergiswil (CH)

( * ) Notice: Subject to any disclaimer, the term of this patent is extended or adjusted under 35 U.S.C. 154(b) by 355 days.

(21) Appl. No.: 13/143,767

(22) PCT Filed: Jan. 15, 2010

(86) PCT No.: PCT/CH2010/000012
§ 371 (c)(1), (2), (4) Date: Jul. 8, 2011

(87) PCT Pub. No.: WO2010/081247
PCT Pub. Date: Jul. 22, 2010

(65) Prior Publication Data

US 2011/0295926 A1 Dec. 1, 2011

(30) Foreign Application Priority Data

Jan. 16, 2009 (EP) .................................... 09150783

(51) Int. Cl.

| | |
|---|---|
| ***G06F 15/16*** | (2006.01) |
| ***H04H 60/58*** | (2008.01) |
| ***H04H 60/40*** | (2008.01) |
| ***H04H 60/37*** | (2008.01) |
| *H04H 20/31* | (2008.01) |

(52) U.S. Cl.
CPC ............... *H04H 60/58* (2013.01); *H04H 20/31* (2013.01); *H04H 60/40* (2013.01); *H04H 60/37* (2013.01)
USPC .................. 709/202; 700/94; 710/5; 711/115

(58) Field of Classification Search
CPC ....... H04H 60/37; H04H 20/31; H04H 60/58; H04H 60/40
USPC .................. 709/227, 202; 725/81, 46, 58, 34; 715/700; 710/8, 5; 348/739; 345/418; 700/94; 711/115
See application file for complete search history.

(56) References Cited

U.S. PATENT DOCUMENTS 7,277,947 B1 * 10/2007 Van De Sluis et al. ....... 709/227
2001/0021998 A1 * 9/2001 Margulis ......................... 725/81

(Continued)

FOREIGN PATENT DOCUMENTS

EP 0598682 A 5/1994
EP 0687083 A 12/1995

(Continued)

OTHER PUBLICATIONS

International Search Report dated Jun. 9 2010, issued in corresponding international application No. PCT/CH2010/000012.

(Continued)

*Primary Examiner* — Jungwon Chang
(74) *Attorney, Agent, or Firm* — Ostrolenk Faber LLP

(57) ABSTRACT

A monitor (10) for capturing audience research data from a computer (2-8) having AV presentation capability is attached to the computer by a connector (12). The connector (12) allows to download software stored in the monitor (10), The software watches AV signals played back by the computer and furnishes data the AV signals to the monitor (12). Optionally, or instead of the software, the data detectable on the connector (10) may be analyzed if they relate to AV signals played back.

18 Claims, 1 Drawing Sheet

(56) References Cited

U.S. PATENT DOCUMENTS

| | | | | |
|---|---|---|---|---|
| 2005/0083741 | A1 | 4/2005 | Chang et al. | |
| 2006/0218309 | A1* | 9/2006 | Young et al. | 710/8 |
| 2007/0006275 | A1 | 1/2007 | Wright et al. | 725/133 |
| 2007/0011611 | A1* | 1/2007 | Lee | 715/700 |
| 2008/0022312 | A1* | 1/2008 | Benco et al. | 725/58 |
| 2008/0052439 | A1 | 2/2008 | Young et al. | 710/305 |
| 2009/0167962 | A1* | 7/2009 | Goodman et al. | 348/739 |
| 2009/0172738 | A1* | 7/2009 | Haijima et al. | 725/46 |

FOREIGN PATENT DOCUMENTS

| | | | |
|---|---|---|---|
| EP | 0887958 | A | 12/1998 |
| FR | 2908571 | A | 5/2008 |
| WO | WO 95/12278 | A1 | 5/1995 |
| WO | WO 02/098029 | A | 12/2002 |
| WO | WO 2004/051997 | | 6/2004 |

OTHER PUBLICATIONS

Notification Concerning Transmittal of International Preliminary Report on Patentability with a mailing date of Jul. 19, 2011 and Written Opinion of the International Searching Authority issued in corresponding International Application No. PCT/CH2010/000012.

Examination Report dated Jul. 9, 2012 issued in corresponding European Patent Application No. 10 700 694.2 (8 pages).

* cited by examiner

MONITOR DEVICE FOR COLLECTING AUDIENCE RESEARCH DATA

CROSS REFERENCE TO RELATED APPLICATIONS

The present application is a 35 U.S.C. §371 National Phase conversion of PCT/CH2010/000012, filed Jan. 15, 2010, which claims benefit of European Application No. 09150783.0, filed Jan. 16, 2009, the disclosure of which is incorporated herein by reference. The PCT International Application was published in the English language.

BACKGROUND OF THE INVENTION

1. Field of the Invention

The present invention relates generally to a device for the capturing of data for audience research and, more particularly, to a monitoring device that is interoperable with a personal computer to enable collection and analysis of data relating to use of such personal computer to access media content.

2. Discussion of the Prior Art

Monitoring devices in audience research serve to monitor and register the audio and/or video impressions of media content and/or advertising delivered to panelists and their video consumption. A main application is to collect and analyze this data to assess the appeal of broadcast (e.g., via cable or over-the-air) programming such as TV programs.

For an as reliable as possible assessment of media consumption by the panelists, the monitoring devices used must perform their task in a manner which is both imperceptible to the panelist and automatic (i.e., without the need for the panelist to provide operating input).

The following summaries of prior art are not to be construed as an admission that anything has been known before the filing date of the present patent application.

WO-A-02/098029 discloses an audience research system using a peculiar remote control of the household appliances. The remote control allows interaction with the users and collects the audience data. For examining media consumption using a personal computer (PC), it is proposed to run a computer program on the PC. This program determines the habits of the computer user and stores the collected data on an internal storage medium of the PC or a portable storage medium (floppy disk, CD-ROM). The captured data comprise streaming media, Internet broadcasts, MP3 files playing etc., and data specifying the location, e.g. the URL, and data and time.

According to FR-A-2 908 571, media consumption in a household is ascertained by installing a sensor in the device(s) connecting the audio/video (AV) appliances with the network, e.g. an ADSL router. The sensor allows tracking of the data packet traffic and the origin of the data. For assigning data packets to a person, an additional identifying means is given to each person.

According to EP-A-0 687 083, the acoustic output of a household AV appliance is picked up by a microphone of the monitor. The monitor has a reference receiver and matches the microphone signal with the audio output of the reference amplifier which scans the available broadcast channels. In a household connected to a cable network, a local emitter is installed which sequentially broadcasts data of the programs available on the cable network. The monitor receives these signals by its reference tuner. Transmission from the local sender to the monitor is by radio waves, ultrasound, or light.

Portable devices called Mediawatch in the shape of a wrist watch have been developed by the applicant, cf. EP-A-0 598 682 and EP-A-0 887 958 which are incorporated by reference in the description.

A Mediawatch takes samples of ambient environmental sound. The samples are subjected to a strong, lossy compression. Evaluation comprises correlation with samples of reference audio signals, e.g. sound samples taken in a broadcast station or reference receivers.

One problem with this technique is that the Mediawatch takes a mixture of different sounds by its microphone. Therefore, the correlation process may be demanding in order to safely ascertain that a specific broadcast is included in the sound samples.

A new development in media consumption is the use of a personal computer to view TV. Known monitor devices permanently coupled to AV appliances are, however, not well suited for or even incompatible with computers.

Furthermore, media may be viewed on any computer having a sufficiently fast connection to the Internet because broadcast stations, TV programs and other media may be received by streaming services. The known monitors, however, have to be connected to AV appliances by trained technicians. Therefore, they can not be used for capturing audience research data in the case of media content being delivered to a panelist using more than one computer, e.g. at home, in the office, in an Internet café, at friends or relatives.

Therefore, it is an object of the present invention to propose a monitor device that allows capturing of audience research data associated with media content delivered to an individual via more than one computer.

SUMMARY OF THE INVENTION

The aforementioned object is addressed, and advance is made in the art, by a monitoring device, which is disclosed herein and which is attachable to a standard personal computer so as to permit signals to be exchanged therebetween. A method for gathering audience research data which may be executed using the monitoring device is also disclosed.

By way of illustrative example, the attachment is achieved via a cable having a connector dimensioned and arranged for insertion into a interface port of a standard personal computer. More preferably, the monitoring device is provided with a connector attached to its housing so that it can be plugged into a computer's interface port. Preferably, the connection utilizes standard universal serial bus (USB) connectors and interfaces because the latter are present on almost any personal computer. A further advantage of the USB interface is that it permits hot-plugging, i.e. attaching and removing the device without the need to shutdown the computer before the manipulation.

The monitoring device comprises an audio "watching" module which is configured to analyze in particular audio data and detect data, marker or other artificially added moieties which are all called ancillary codes. Alternatively, or additionally, the watching module may process the audio data (or signal) to derive therefrom characteristic data of significantly less data volume, which data may later be used to identify the audio data by a matching process involving reference data.

The "watching" module of the monitoring device is so named in analogy to the panelist watching the media presentation, even if she only listens to a radio program.

The intercepted path of audio data relates to data generated or transmitted by the computer system and intended to create sound like music or speech, possibly accompanying a visual representation like a film or a TV program. Audible reproduction may be by internal loudspeakers or by an appliance connected to the computer.

Media output like sound is often part of the operating system (OS). It provides a well-defined interface for software applications. Generally, it is also possible to link drivers or other pieces of software to this part of the OS. Such software will receive any output supplied to the audio interface of the OS.

Generally, such software will receive the audio data approximately simultaneously with its actual output, i.e. the generation of the acoustical representation.

Hence, this option offered by many OSs to install software in a standard audio output path is very well suited for installing a program for watching or monitoring the audio output of a computer system, including the audio output occurring during consumption of AV media.

BRIEF DESCRIPTION OF THE DRAWINGS

The various features and functions of the invention shall be explained more in detail by reference to the preferred exemplary embodiment described herein, taken in conjunction with the annexed Figures, in which.

DETAILED DESCRIPTION OF THE INVENTION

Figure 1:
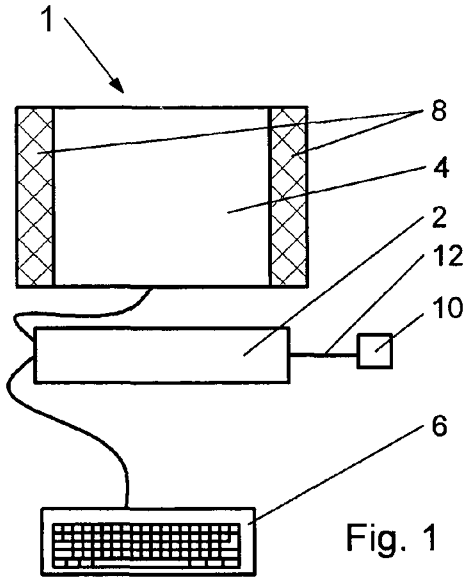
FIG. 1 is a schematic arrangement of a PC with a monitor device.
Figure 2:
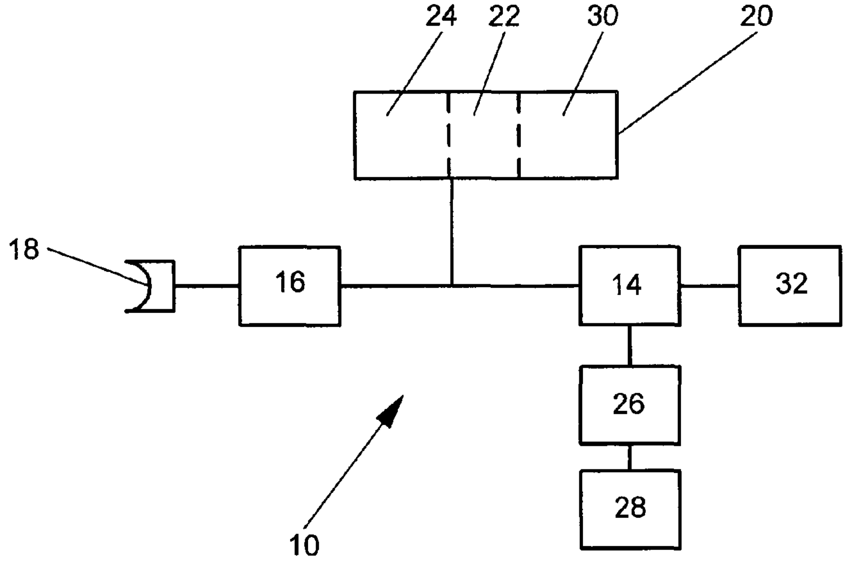
FIG. 2 is a block diagram of the monitor device.

Within initial reference to FIG. 1, a PC 1 usually comprises a central unit 2, a screen or monitor 4 and a keyboard 6. For multimedia purposes, loudspeakers 8 can be present as well. There may be still other peripheral components and accessories, like a mouse, printer, digitizing tablet etc. Hence, the illustrated structure of the PC is not limiting. For example, all the components may be integrated in one housing, as is the case with portable PCs. The components may also be constituted by other means, e.g. the keyboard may be replaced by a touch screen or a pointing device, and the screen or loudspeaker may be constituted by a TV set or an audio appliance, respectively.

The monitor device 10 is connected to the computer, i.e. its central unit 2, by a standard connection link 12, in particular a USB cable 12. More preferred, however, is the integration of a USB plug in the monitor device 10 so that the device resembles the so-called USB sticks. USB sticks are quite tiny, e.g. characterized by a volume of 30 ml or less, and therefore, can be continuously carried by the panelist. In order to increase the compliance, the panelist can use the stick as a mass storage device.

Inside the monitor device, a sampling portion 14, e.g. similar to that in the Mediawatch, is arranged. Additional circuitry 16 manages normal connectivity over the USB connection (plug 18), observes data circulating on the USB connector and detects audio and/or video data which are transferred to the sampling portion 14. The device 10 further contains a memory 20 in which a peculiar software 22, the monitor software, is stored. The memory 20 comprises additionally a conventionally accessible part 24 so that the monitor may even be used as an external mass storage, i.e. like a USB memory device (USB stick etc.). Thereby, the devices present a personal advantage in the daily life of a panelist, hence improve acceptance by the carrier and willingness to carry it permanently along and use it.

A USB memory device is mostly treated by the operating system similarly to an internal mass storage device as a harddisk or a CD drive, and the OS usually provides a so-called "autostart" functionality, i.e. to start a suitably configured and stored software on the device automatically each time the USB device is newly discovered by the OS, regularly during start-up or after plugging-in. Alternatively, the software may be activated as a driver for the USB stick. The software may be permanently installed so that the next time the stick is connected, the software is immediately activated.

In the case of the present monitor device, the autostart software installs itself in the computer in a way that it interacts with the audio/video interfaces or watches the operation of the logical or physical AV or multimedia devices. Additionally, it also integrates in the network functions in order to watch ingoing and outgoing network traffic. Techniques to perform these tasks are known per se, e.g. as "virtualizing", and are therefore not described in detail. The addresses of the detected data streams, such as Internet protocol (IP) addresses and domain names, or uniform resource locators (URLs), are stored together with the time they occurred.

Audio data are furnished via the USB connection 12 to the sampling portion 14 in the data monitor. The sampling portion 14 derives therefrom the samples and stores them in the memory 30. Preferably, if at the same time data streaming is observed, addresses of the data packets, like the IP address, or the URL, are stored together with the sample. The time is always stored together with the samples to allow the correlation with reference samples taken at the same time.

An alternative consists in storing audio samples and Internet traffic data (addresses of packets; type of packets if more than one type is registered, optionally additional data, e.g. content samples) separately, each with an indication of the exact time of capture. Correlating the data is done in the evaluation center.

Additionally or alternatively, the sampling portion 14 may extract ancillary codes contained in the audio signal. One known technique to insert such ancillary code in an practically inaudible way is the so-called watermarking. The ancillary code may contain identifying data like indication of the programs, distribution channels, time. Preferably, the data are unique in time, so that the occurrence of a code stemming from a point in time different from real time indicates a time shifted play-back, e.g. of a recorded program or a time-shifted program as implemented in some settop boxes needed for receiving digital TV.

The monitoring device still needs an as exact as possible time. For this purpose, it may contain a high precision time component 26. However, for continuous operation, an energy source 28 is required like a button cell. An alternative, but of limited operating time, are the capacitors of high capacitance which are charged via the USB connectors. Another possibility is to provide the monitor with a means for obtaining exact time information from other sources. E.g. a receiver of time reference signals aired by a time signal broadcast station may be present. A second possibility is to access time sources on the Internet via the PC the monitor is connected to. This task may be accomplished by a piece of software automatically executed when the stick is discovered by the OS.

A situation still to be considered is that the video content on the screen of a computer is partially or in its entirety hidden by another window, or more generally the output area of another program. The software running on the computer preferably even monitors the video output and determines if the video output is completely visible, partially visible, or not visible at all. In case of partial visibility, it may additionally determine the degree of visibility, e.g. as a percentage of the visible area relative to the entire area covered by the video representation.

Finally, due to increasing power of computers, most or all data gathering and processing may be executed on the computer, including the sampling, compressing and further processing of the audio content. With this embodiment, the resulting data may even be immediately transferred to the evaluation center if the software on the PC is able to establish a connection to the center, e.g. via a permanent Internet connection. In this situation, the monitor device will serve as a data storage for the audience research data, either permanently or only if no direct connection to the evaluation center can be established. Furthermore, it will provide the software with data identifying the panelist to accompany the transferred data. It will, however, not perform any, or at least not significant, data processing. The data processing requires resources of the computer, but decreases the amount of data exchange on the external connection system which the monitor device is attached to. Capacity of the connection system, e.g. the USB bus, may be more important for the convenience of the panelist, more particularly the disturbance-free playback of video content, than relieving the computer from data processing tasks.

For operation, a piece of software ("sensor program") has to be run on the computer. Its basic task is to deviate or branch media data, in particular audio data representing sound presently output by the computer, to the monitor device 10. Further tasks of the sensor program are to measure used URLs or data tags and perform part of the data processing (e.g. compression, extraction of embedded data like watermarks and ancillary codes, creation of fingerprints). As already mentioned above, it may even perform all data processing.

One method is to run the sensor program from the monitor device. For instance, the monitor device may behave as a storage medium or drive, and the sensor program is activated by the autorun functionality of the OS which gets active each time the monitor device is attached to the computer and is freshly recognized by its OS.

An alternative is to run a setup or installation program by the same method. Thereby, the "sensor program" is permanently installed on the computer and is at least latently started each time the OS boots or the user logs in. "Latently" means that the sensor program is waiting for the monitor device to be connected to the computer. Only after detecting the connected monitor device, does the sensor program become active and furnish data to the monitoring device.

However, it is often disliked to have a fully automatic installation or setup run on a computer. In some environments, the autorun function may even be disabled, and a user may not have sufficient rights to perform an installation. The nearby possibility that the user manually starts the sensor program, has obvious disadvantages: This procedure requires a special activity by the user which on one hand impairs acceptance of the device, and on the other hand causes a risk of dissatisfactory reliability of statistical data due to irregular activation of the sensor program.

Hence, a method has been developed of increasing the simplicity of activating the sensor program and requiring a minimal collaboration of the panelist.

Basically, on the software-side, the concept is to permanently install the sensor program software if the monitor device is connected to a computer where the sensor program is not running. This may be on a system-wide level or, in more security-aware environments, in the personal working environment of the user. Thereafter, either during boot of the OS (system wide installation) or when the user logs in to the computer, the sensor program is automatically activated in the already mentioned latent state. Thereby, the system is not charged by unnecessary activity of the sensor program.

Of course, the sensor program may also permanently run if the produced data are disposed of as long as the monitoring device is not attached.

The preferred solution of this issue consists in a monitoring device which appears to the system as different types of external devices. For instance, the presently widespread USB allows the connection of numerous and different devices to a computer. Each device may appear as one or more logical devices, e.g. a human input device may at the same time act as a keyboard and a mouse. Other typical devices are printers, scanners, storage devices (CD-Rom, hard disk, floppy disk, etc.).

A further characteristic of the USB is that the devices may be connected while the system, i.e. the computer, is running. In other terms, the connection system (or bus) supports hot-pluggable devices. The present invention is, however, not restricted to a USB. Any, other existing or future connection system may be used as well. An important feature of the connection system is that a device can be considered as a set of logical devices of different kinds so that the needed functionalities can be established by only one physical connection. It is, however, not excluded that the monitor device has more than one physical connector (plug, etc.), or the connection may be established in a wireless technique (radio, light, ultrasound) so that the monitor device may simulate a set of devices.

In a preferred execution mode using the presently common USB, the monitor device is able to appear as three devices:

1. A common mass storage device, preferably a read-only kind, e.g. an optical disk drive (CD-Rom, DVD-Rom, etc.);
2. A human interface input device, preferably a keyboard;
3. A special device, called a data collector device in the following description.

The devices 1 and 2 are standardized. Therefore, the system will recognize these two devices and activate them using the available "standard profiles". In general, a profile consists of software and/or data which allows the OS to interact with a device connected to the computer.

For generally known devices, like keyboards, mass storage drives, the OS is provided with the capability (for USB: with the profile) to handle at least the basic functionalities of such a device. E.g. for a keyboard, the standard profile handles the standard character set and some basic special keys.

When the keyboard part of the monitor device is bound by the OS, i.e. acknowledged and registered as a keyboard, the monitor device can send key sequences to the computer. These key sequences may typically perform the following functions with an example for each function given based on one of the present Windows® systems:

- Activation of a command shell [" Windows®-R"] ("DOS prompt")
- Input of the name of a program [e.g. "J:setup<magic>.exe"]residing on the mass storage part, with <magic>being an individual identification sequence of this program
- Awaiting the result of launching the program: The storage part may detect accession to the program, or the collector part detects the activity of the program (cf. below)
- Closing the command shell ["Exit"]

The use of an individual, unique identifier of the program (here: by using a "magic" sequence of characters in its name) avoids starting an unknown program on an accidentally present drive "J:". Instead of "J:", any other program location designation may be used. In general, several such commands have to be entered because the designation may be dynamically assigned by the OS and, therefore, is unknown to the keyboard part of the monitor device. If the locations are disk drive letters, the keyboard may sequentially try all possible letters from "A:" to "Z:".

The keyboard part faces the basic issue that it has to act in a blind manner. The only confirmation of its success is activities detected by the other parts of the monitor device. Furthermore, it has to act as imperceptibly as possible, i.e. it should not disturb the panelist in using the computer.

For complying with the latter requirements, the keyboard commands shall be as short as possible and be entered during a shortest possible period. Hence, the commands may be executed as a background process, i.e. essentially invisibly. For example, as an alternative of immediately executed commands, the keyboard may generate a command script on the fly which essentially consists of calls of the initial program on the different possible locations, and may run in the background, possibly even with a lowered execution priority.

Figure 3:
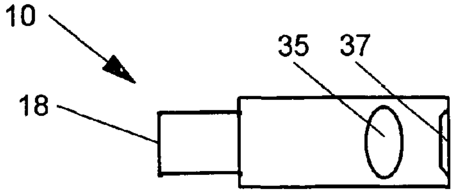
FIG. 3 is an illustration of the monitor device.

The second issue in current multi-user systems is that the user first has to log into the system so that the input device is accepted by the OS. Therefore (cf. FIG. 3), the monitor device 10 is provided with a push button 37 or the like as a trigger which she has to press as a signal to the input device that she has logged in. Preferably an indicator 35 (optical, acoustic or the like) is also present which indicates that the input device is waiting for the push button 37 to be pressed.

If the input device succeeds in launching the initial program on the storage part, the initial program copies the required software (the "sensor program") to the computer and registers it as one of the programs to be started automatically each time the user logs in (or, in a single-user system, has started the computer and the OS). Thereafter, the sensor software is started. If the user logs in again on this computer, the sensor software will be started by the OS.

In a first stage, the sensor program permanently checks if the data collector device is connected to the system. Once it succeeds, it enters the active state and connects to the data collector device. On the USB, this may involve loading the peculiar profile for this USB device.

In a second step, the sensor program sends instructions to the data collector device so that it is informed of the active connection and disables the input part of the monitor device. The indication that the input device is waiting for a confirmation by the user of having logged in is replaced by an indication that the monitor device is operative, e.g. by a steady green light ("operative") instead of a flashing red light ("waiting for confirmation").

The sensor program intercepts the path of audio data within the OS and sends the audio data to the monitor device, more particularly to its data collection portion, additionally to the original destination, or performs the required data processing.

The treatment of these audio data (analyzing, sampling, compression) requires significant computing efforts which shall, however, at most insignificantly impair the performance of the PC. Accordingly, the sensor program on the PC may apply part of the entire data processing, e.g. taking short samples within significantly larger intervals, e.g. samples of 1 s each minute, or in other terms samples of 1/10th to 1/100th—duration of the sampling interval.

The sensor program independently thereof performs its other tasks (monitoring data traffic, particularly registering used URLs, analyzing audio and/or determining visibility of video content).

Additionally, loss-less compressing measures of low computing demand may be applied in order to further reduce data traffic on the connection to the monitor device where still other devices may exchange data like the regular keyboard, a printer, etc.

In the monitor device, the final sampling and data processing is performed by its internal circuitry, and software is preferably that of the Mediawatch of the applicant which has been disclosed inter alia in EP-A-0 887 959 which is incorporated by reference.

Use of the Monitor Device

Each time a panelist starts using a computer she will plug the monitor device 10 shaped as a USB stick in a USB connector. If this is the first time it is done by this user (more exactly, for a multi-user system: the user of the presently used user identification), nothing will happen, except the indication will appear on the monitor device that it is connected yet waits for its activation. The indication may be e.g. a red flashing light.

When the user has logged into the computer she will press a push button 37, which triggers the keyboard device in the monitor device. Keyboard commands are sent to the computer which tries to launch the initial program on the storage device of the monitor device. If access to this program is detected by the storage device, or the activity of the thereby installed sensor program is detected by the data collector device, and on exhaustion of all predefined command sequences, the keyboard device will stop sending keyboard commands. Finally, it may still send housekeeping commands like a command to close the command shell.

The same happens if the monitoring device is connected a further time if the software has not yet been installed.

If, however, this procedure has already been executed by this user, the sensor program will be started shortly after logging-in and search for the data collector device on the USB bus, or the OS automatically launches the sensor program in the course of activating the data collector device as prescribed by the profile installed for this device.

The sensor program will, as a first step, send a confirmation to the data collector device that the audio monitoring is active. The data collector device deactivates the keyboard device and, as a confirmation to the user, will activate a corresponding indicator, e.g. a green light of the indicator 35.

The sensor program will continuously watch if audio data are transferred to the audio output system, and copy them to the data collector device.

Finally, the data collector device may extract embedded data, like watermarks or other embedded data or marker, or create data characterizing the audio signal like heavily compressed samples or signatures, or combinations thereof. Generally, it will complement the sensor software in creating the audience research data.

The data may be temporarily stored on the monitor device and transferred to a center later on. It may, however, also be transferred through the watched computer in using its Internet connection. The samples, codes and/or Internet traffic data 30 have to be transferred to a center for evaluation. This may be done by a telecommunication portion 32 in the monitor 10. The telecommunication portion 32 may e.g. search and connect to a base station in the panelist's home and transfer the data to this base station.

The telecommunication portion 32, in this case, comprises an RF transmitter receiver for wireless data transfer.

An obvious alternative is connecting the device directly to a USB connector of the base station. In order to remind the panelist of the need to connect the monitor to the base station, suitable indicators, e.g. lights, may be provided in the monitor, or the software may produce suitable warnings, e.g. a message on the screen 4 or a spoken message.

A third variant consists in that the monitor software provides for transmitting the samples to the center for evaluation via the Internet when the monitored computer has Internet access.

A still further option is to provide the monitor with wireless communication capabilities. In particular, it may comprise a component for automatically connecting to a wireless telephone network and transmitting the data.

On the basis of the description above, the one skilled is the art may conceive alterations and modification without leaving the scope of protection which is defined by the attached claims.

For instance, the following is conceivable:

Omission of an integrated power supply, namely if time information is provided from a computer, the Internet or by a wireless connection.

Use of another connector, like a PC-card, often found in portables; a memory card connection; or bus systems.

Some operating systems may require that a complete installation of the sensor program requires enhanced rights, e.g. the user must log in as a system administrator. After the installation, however, the user may log in using his regular user identification. Often, in such systems, the installation is system-wide. Hence, in a household, other members do not have to repeat the installation. The sensor software may even be installed only partly, i.e. as much as possible with the rights of the panelist, and may try later on to complete its installation.

If a panelist uses the monitor device the first time on a computer running such an OS, he may receive a message that his rights are insufficient to install the software, and asking him to log in with a user identification having the required powers.

The data storage means furnishing the initial software may appear as a remote data server, e.g. as a so-called FTP server.

The data storage means may be capable, e.g. by a wireless communication line, to fetch the required data from a remote server, and/or to at least try to update the locally stored software if necessary.

If the connector 12 is provided with the capability to incite a software download and start process, e.g. particularly a signal line, the monitor may be provided with a portion for activating this process.

The sensor program may determine the performance of the PC and distribute on this basis data processing between itself, i.e. the computer it is running on, and the monitor device, in order to balance out computing and data transfer demand.

If the sensor software is installed, yet does not find a monitoring device it may ask the user to attach it, e.g. to plug in a USB connector.

Glossary

AV audio/video

IP Internet protocol

IP address the unique address of a computer in the Internet, according to the IP protocol OS operating system PC personal computer URL uniform resource locator: name of a location of data, e.g. in the Internet USB universal serial bus

What is claimed is:

1. A monitor device for capturing audience research data, the monitor device comprising:

a non-volatile memory;

a data connector dimensioned and arranged for removable connection to a computer and configured to exchange data signals therewith, and a software product residing in the non-volatile memory and capable of being loaded onto the computer from the non-volatile memory when the data connector is connected to the computer and, when the software product is running and the data connector is connected to the computer, the computer is rendered capable of furnishing data to be monitored by the monitor device through the data connector to the monitor device, the data to be monitored by the monitor device characterizing an audio signal output by sound output means of the computer, the monitor device being configured to appear to the computer as at least an input device which is usable for sending commands to the computer, the monitor device further comprising a data furnishing device capable of furnishing data representing at least the software product in response to a a request received from the computer, so that the monitor device can send commands to the computer to incite loading the software product onto the computer, the monitor device not including the computer, wherein the software product includes an audio monitoring software that is interoperable with the monitor device, wherein the audio monitoring software is configured to launch automatically in a passive state at the latest when a user logs in on the computer, the audio monitoring software is configured to check the system continuously or intermittently to determine if the monitor device is connected to the computer, and wherein if the monitor device has been determined to be connected to the computer, the audio monitoring software determines whether a data connection to a remote server capable of accepting data can be established;

if the data connection has been established, the audio monitoring software sends data it produces over the data connection to the remote server, or if no connection has been established, the audio monitoring software sends the data to the monitor device for storing.

2. A monitor device according to claim 1, wherein the monitor device further comprises a data collector device comprising a memory so that the characterizing data can be stored in the memory.

3. A monitor device according to claim 2, wherein the data collector device and/or the data furnishing device are capable of inhibiting the input device from sending commands to the computer.

4. A monitor device according to claim 1, wherein the monitor device is provided with a manually operable interface connected to the input device, and the input device is designed to send commands if the manually operable interface is operated.

5. A method for installing software on a computer using the monitor device of claim 1, the computer being connected to the monitor device, wherein the following steps are executed:

A. Waiting for a trigger signal sent to the monitor device;

B. Sending commands to the computer, the commands comprising at least one instruction to run a program.

6. A method according to claim 5, wherein step B is repeated for at least two storage locations of the program, with the storage locations each having one possible name of the data furnishing device.

7. A monitor device for capturing audience research data, the monitor device comprising:

a non-volatile memory;

an audio watching module for taking audio samples from and/or extracting ancillary codes embedded in an audio signal, and a first memory, a data connector dimensioned and arranged for removable connection to a computer and configured to exchange data signals therewith, and a software product residing on the non-volatile memory and capable of being loaded onto the computer from the non-volatile memory when the data connector is connected to the computer and, when the software product is running and the data connector is connected to the computer, the computer is rendered capable of furnishing data to be monitored by the monitor device through the data connector to the monitor device, the data to be monitored by the monitor device representing an audio signal output by sound output means of the computer, in order to examine the audio signal by the audio watching module and to store the result in a first non-volatile memory section in the monitor device, the monitor device not including the computer and is configured to be recognized as an input device when connected to a computer, wherein the software product includes an audio monitoring software that is interoperable with the monitor device, and wherein the audio monitoring software is configured to launch automatically in a passive state at the latest when a user logs in on the computer;

the audio monitoring software is configured to check continuously or intermittently to determine if the monitor device is connected to the computer; and the audio monitoring software is configured to send data characterizing audio output of the computer to the monitor device if the monitor device has been detected to be connected to the computer.

8. A monitor device according to claim 7, wherein the monitor device comprises a second memory, reading of and writing to the second memory being possible, and a data transfer module between the first and the second memory, on one hand, and the data connector, on the other hand, so that the monitor device is usable as an externally attachable storage device by the computer.

9. A monitor device according to claim 7, wherein the audio watching module is configured to take samples of periods significantly longer than the sample each time, and to compress the samples, preferably by at least 100.

10. A monitor device according to claim 7, wherein the monitor device comprises a detection module for detecting data transfer on the connector, to extract identifying data if a particular type of data is observed and to store the identifying data in the first memory.

11. A monitor device according to claim 7, wherein the monitor device comprises a network traffic observation software which is capable of interacting with the computer's network communication and of furnishing copies or at least data identifying the data exchanged with the network to the monitor device through the data connector.

12. A monitor device according to claim 7, wherein the data connector comprises at least one of:

a wireless communication interface; and an interface for transferring data through the data connector to the computer for forwarding by the computer;

in order to transmit the data stored in the first memory to data collection and evaluation locations.

13. A monitor device according to claim 7, wherein the data connector is a connector usually used for at least a personal computer for connecting external devices during operation of the personal computer.

14. A monitor device according to claim 7, wherein a casing of the monitor device, including the data connector, has a maximum volume of 30 ml.

15. A method of capturing audio output of a computer using a monitor device according to claim 7, according to the following steps:

A. Testing if the monitor device is connected to the computer, and repeating step A as long as it fails;

B. Sending intermittently or continuously a copy of the audio output of the computer to the monitor device; and C. Processing the audio output by the monitor device in order to derive data characteristic for the audio output of the computer;

in order to minimize an effect of the capturing of the audio output on performance of the computer.

16. A method of gathering audience research data associated with media content delivered via a personal computer, comprising the steps of:

providing from a non-volatile memory of a detachable monitoring device a monitoring software the monitoring software being configured to be loaded and executed by a personal computer each time the monitoring device is attached to the personal computer, and the monitoring device being configured to be recognized as an input device to the personal computer;

loading the monitoring software onto a first personal computer when the monitoring device is connected to the first personal computer;

launching the monitoring software automatically in a passive state at least when a first user logs onto the first personal computer;

continuously or intermittently checking to determine whether the monitoring device is connected to the first personal computer;

detecting when a user of the first personal computer is accessing media content having an audio component; and sending data to be monitored by the monitoring device to the monitoring device when it is determined that the monitoring device is connected to the first personal computer, the data to be monitored by the monitoring device being associated with the accessed media content having an audio component;

storing the data to be monitored in a non-volatile memory section in the monitoring device, the monitoring device not including the personal computer.

17. The method of claim 16, further comprising:

detaching the monitoring device from the first personal computer; and attaching the monitoring device to a second personal computer;

detecting when a user of the second personal computer is accessing media content having an audio component; and sending data associated with the media content having an audio component accessed via the second personal computer to the monitoring device.

18. The method of claim 16, wherein the audio monitoring software attaches to the data sent to the remote server at least an identifier obtained from the monitor device.

* * * * *